(12) United States Patent
Tajima et al.

(10) Patent No.: US 9,566,863 B2
(45) Date of Patent: *Feb. 14, 2017

(54) VEHICLE UPHOLSTERY MEMBER

(75) Inventors: Yoko Tajima, Saitama (JP); Mayumi Asaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1143 days.

This patent is subject to a terminal disclaimer.

(21) Appl. No.: 13/318,640

(22) PCT Filed: Apr. 22, 2010

(86) PCT No.: PCT/JP2010/002920
§ 371 (c)(1),
(2), (4) Date: Nov. 3, 2011

(87) PCT Pub. No.: WO2010/128580
PCT Pub. Date: Nov. 11, 2010

(65) Prior Publication Data
US 2012/0052262 A1 Mar. 1, 2012

(30) Foreign Application Priority Data
May 7, 2009 (JP) ................................. 2009-112922

(51) Int. Cl.
| B32B 3/10 | (2006.01) |
| B60K 37/04 | (2006.01) |
| B44F 1/10 | (2006.01) |
| B60R 13/02 | (2006.01) |

(52) U.S. Cl.
CPC ................. *B60K 37/04* (2013.01); *B44F 1/10* (2013.01); *B60R 13/02* (2013.01); *B60R 13/0243* (2013.01); *B60R 13/0256* (2013.01); *Y10T 428/24802* (2015.01)

(58) Field of Classification Search
USPC .................................... 428/156, 173
See application file for complete search history.

(56) References Cited

U.S. PATENT DOCUMENTS

| 5,199,744 A | 4/1993 | Shenton | |
| 2005/0186396 A1* | 8/2005 | Okajima et al. | 428/167 |
| 2007/0275213 A1 | 11/2007 | Shimizu | |
| 2008/0305305 A1* | 12/2008 | Sano et al. | 428/168 |

FOREIGN PATENT DOCUMENTS

| DE | 10 2007 058 715 A1 | 6/2008 |
| JP | 5-008160 Y2 | 3/1993 |
| JP | 5-089099 U | 12/1993 |
| JP | 5-89099 U | 12/1993 |
| JP | 7-164800 A | 6/1995 |
| JP | 2007-314909 A | 12/2007 |

* cited by examiner

*Primary Examiner* — Christopher Polley
(74) *Attorney, Agent, or Firm* — Carrier Blackman & Associates, P.C.; Joseph P. Carrier; Anne G. Sabourin

(57) ABSTRACT

An ornamental structure for a vehicle upholstery member provides a plurality of surface patterns by using a single vehicle upholstery member. The surface of the upholstery member is formed with a first emboss pattern and a second emboss pattern different from the first emboss pattern in a mutually superimposed relationship. Depending on the viewing angle of a vehicle occupant, the first emboss pattern obscures the light reflected from the profiles of the second emboss pattern or the second emboss pattern obscures the light reflected from the profiles of the first emboss pattern, and one of the patterns is more visually emphasized than the other.

11 Claims, 7 Drawing Sheets

VEHICLE UPHOLSTERY MEMBER

TECHNICAL FIELD

The present invention relates to an upholstery member for four-wheel vehicles (vehicles), and in particular to an ornamental structure for a vehicle upholstery member.

BACKGROUND OF THE INVENTION

The upholstery member used in the instrumental panel of a vehicle is required to be provided with favorable utilitarian attributes such as the ease of assembly work and high durability but also attractive appearance. It is known to texture or emboss the surface of the vehicle upholstery member, and impart the appearance of natural leather to the vehicle upholstery member. See Patent document 1.

PRIOR ART DOCUMENT(S)

Patent Document(s)

Patent document 1: JP 2007-314909A

BRIEF SUMMARY OF THE INVENTION

Task to be Accomplished by the Invention

As disclosed in Patent document 1, conventionally, the emboss that was applied to a vehicle upholstery member consisted of a single pattern, and a plurality of upholstery members were required in order to combine a plurality of emboss patterns. For instance, if a part of an instrument panel is to be given with a wood grain emboss or woven carbon fiber emboss while the remaining part of the instrument panel is generally to be given with a natural leather emboss, a separate panel given with a wood grain emboss or woven carbon fiber emboss was fitted into the natural leather embossed instrument panel. However, such a structure increases the required number of component parts and the amount of the assembly work so that the work efficiency is impaired. Furthermore, the boundary between the two component parts may detract from the appearance of the instrument panel.

The present invention was made in view of such problems of the prior art, and has a primary object to provide an ornamental structure of a vehicle upholstery member that can combine a plurality of different surface emboss patterns in a single upholstery member.

Means of Accomplish the Task

The present invention provides an embossed vehicle upholstery member, wherein: a first emboss pattern and a second emboss pattern are formed on a surface of the upholstery member in a mutually superimposed relationship, the first emboss pattern presenting a view having a different dependency on a viewing angle from that of the second emboss pattern.

By thus combining at least two emboss patterns having different viewing angle dependencies into a single upholstery member, a continuously variable appearance can be achieved with a single upholstery component without using a plurality of component parts. For instance, two kinds of surface irregularity patterns may be combined such that the light reflected from one pattern may be related to the light reflected from the other pattern differently depending on the viewing angle. If one of the patterns consists of an extremely fine irregular pattern, interferences may be caused in the reflected light depending on the viewing angle so that the upholstery member may present different appearances depending on the viewing angle of the vehicle occupant. The appearance as used herein means combinations of patterns, textures, gloss, colors, etc.

The first emboss pattern differs from the second emboss pattern so that, depending on the viewing angle of a vehicle occupant, the first emboss pattern obscures the light reflected from the profiles of the second emboss pattern or the second emboss pattern obscures the light reflected from the profiles of the first emboss pattern, and one of the patterns is more visually emphasized than the other.

According to this structure, when the vehicle occupant views the surface of the upholstery member from front, the first and second emboss patters are in a mutually superimposed relationship. When this surface is viewed from an oblique direction, one of the emboss patterns obscures the light reflected from the other emboss pattern so that the other emboss pattern is concealed by the one emboss pattern, and only the one emboss pattern is emphasized over the other. Therefore, the pattern of the upholstery member looks different depending on the viewing angle of the vehicle occupant. It is also possible to progressively vary the appearance of the surface pattern as the viewing angle is changed. According to this structure, as the single vehicle upholstery member provides two different patterns, a plurality of patterns may be combined in a single component so that the number of component part and the amount of assembly work can be both reduced, and the production efficiency can be improved. As the appearance of the surface pattern can be progressively varied depending on the viewing angle, the boundary between two patterns can be made almost invisible, and the ornamental effect can be enhanced.

In this structure, the first emboss pattern may be primarily formed by curved lines, and the second emboss pattern may be primarily formed by straight lines as seen in plan view. Thereby, the two patterns may be favorably combined in a single component.

In this structure, the first emboss pattern may be defined by a substantially finer emboss than the second emboss pattern. Also, the first emboss pattern may be defined by a surface irregularity having a greater vertical deviation than the second emboss pattern. Further, the first emboss pattern may be defined by a surface irregularity having a steeper profile than the second emboss pattern.

In this structure, the upholstery member may extend along a contour including a pair of planes forming an angle relative to each other and smoothly connected by a curved plane. When the upholstery member incorporated with the above mentioned emboss patterns is applied to the curves surfaces of a vehicle instrument panel, the lower frame of a side window, the arm rest provided on the door upholstery member, the appearance of the upholstery member can be changed from one pattern to another by using a single upholstery member.

Effect of the Invention

Thus, the present invention provides an ornamental structure of a vehicle upholstery member that can combine a plurality of different surface emboss patterns in a single upholstery member.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
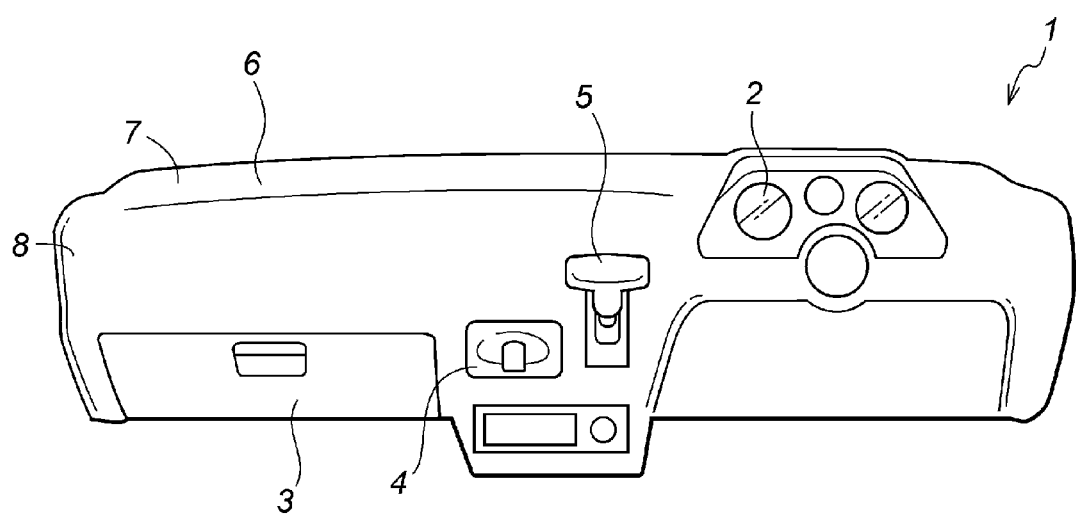
FIG. 1 is a front view of a vehicle instrument panel embodying the present invention as seen from inside the vehicle.

Now the present invention is described in the following by taking an example of an ornamental structure for a vehicle upholstery member with reference to the appended drawings. FIG. 1 is a front view of a vehicle instrument panel 1 embodying the present invention as seen from inside the vehicle, and FIG. 2 is a front view of a vehicle door 10 embodying the present invention as seen from inside the vehicle.

Referring to FIG. 1, the instrument panel 1 is placed in a front part of the passenger compartment of the vehicle, and is fitted with a meter cluster 2, a glove box 3, a storage device 4 and a (transmission) selector lever 5. The instrument panel 1 is covered by an upholstery lining 6 which includes a panel upper part 7 extending horizontally rearward from a windshield (not shown in the drawing) and a panel front part 8 connected to the panel upper part 7 via a smooth curved surface.

Figure 2:
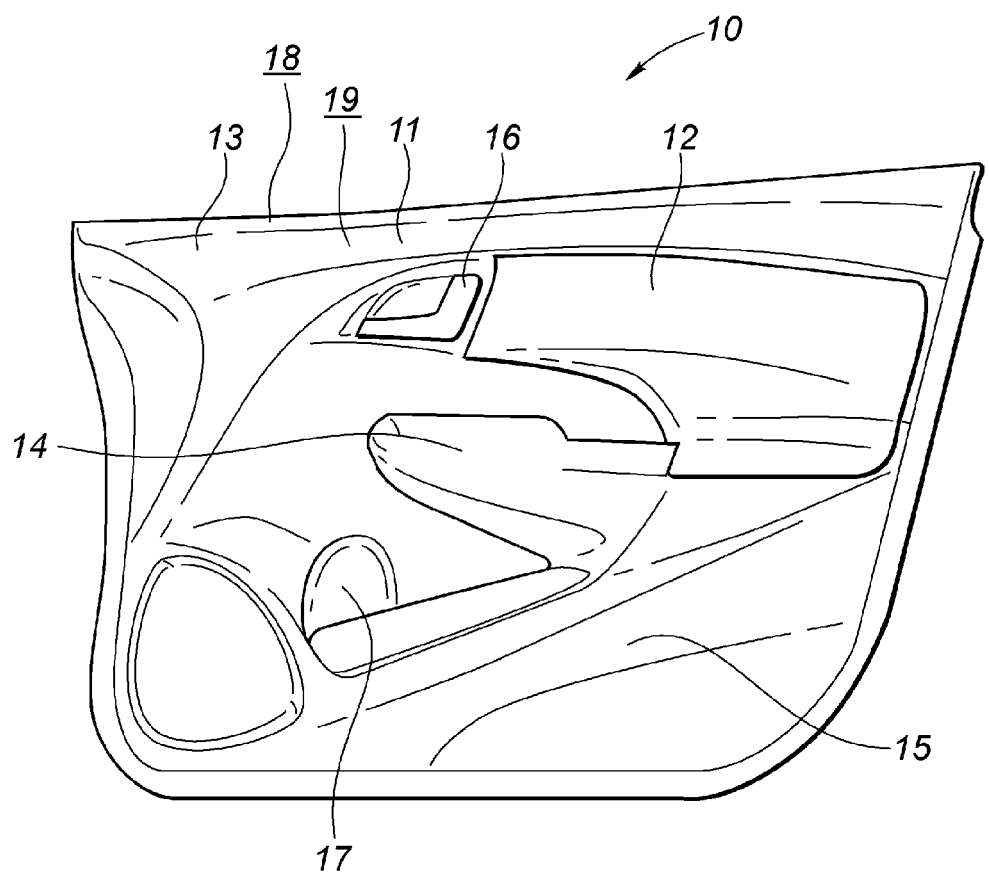
FIG. 2 is a front view of a vehicle door embodying the present invention as seen from inside the vehicle.

Referring to FIG. 2, the vehicle door 10 is covered by a door upholstery lining 11 which is contoured or provided with openings so that a door grip, a loudspeaker, a power window switch and a storage pocket may be formed or fitted in the door 10. The door upholstery lining 11 includes three bulges 13, 14 and 15 (bulging toward the passenger compartment) formed in an upper part adjacent to a side window (not shown in the drawing), an intermediate part and a lower part, respectively, and each having a certain width and extending in a fore and aft direction. The upper bulge 13 is fitted with a door handle 16 for opening the door 10. An armrest 12 made of a separate member is mounted in a part of the door extending from the upper bulge 13 to the intermediate bulge 14, and is also covered by the door upholstery lining 11. The lower bulge 15 defines a recess serving as a storage pocket 17.

The upper bulge 13 includes a bulge upper part 18 extending substantially horizontally inboard from the side window (not shown in the drawing) and a bulge front part 19 connected to the bulge upper part 18 via a smooth curved surface. The intermediate and lower bulges 14 and 15 each similarly include a plurality of parts that are connected to one another via smooth curved surfaces. Vehicle upholstery structures are known to make use of many other upholstery members including two or more parts that are connected to one another via smooth curved surfaces similarly as the panel upholstery lining 6 and the door upholstery lining 11.

Figure 5A:
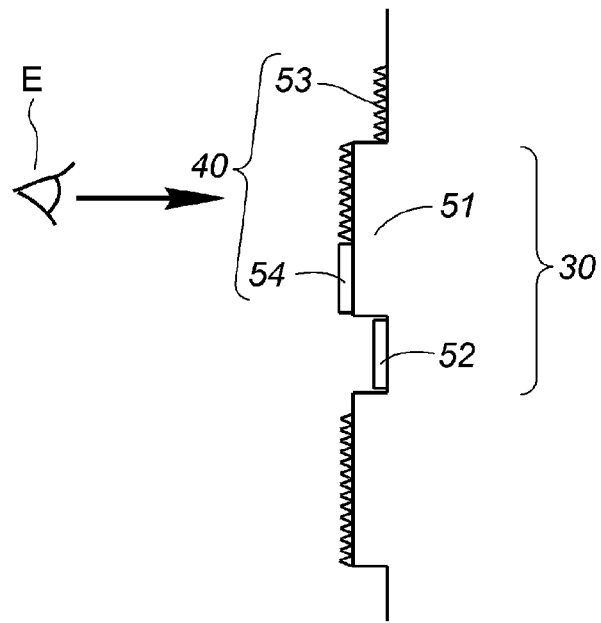
FIG. 5 is a cross sectional and a front view of the combined surface emboss pattern as seen from front.
Figure 5B:
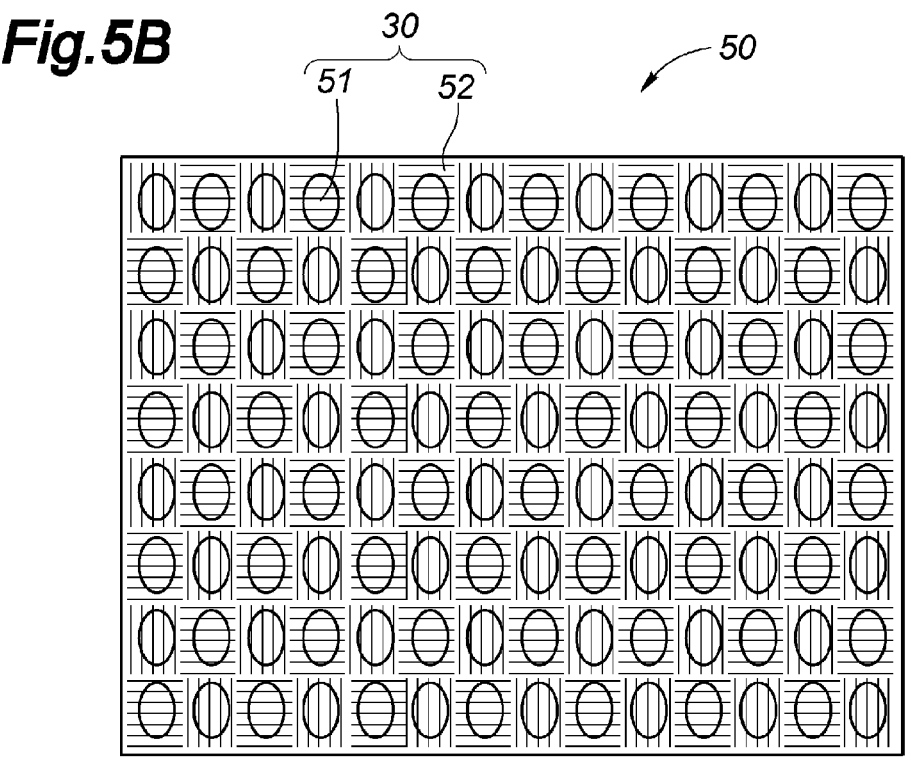
Figure 6A:
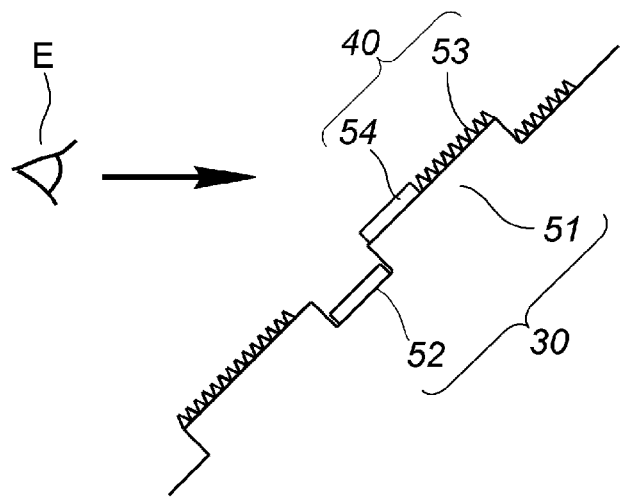
FIG. 6 is a cross sectional and a front view of the combined surface emboss pattern as seen from an oblique angle.
Figure 6B:
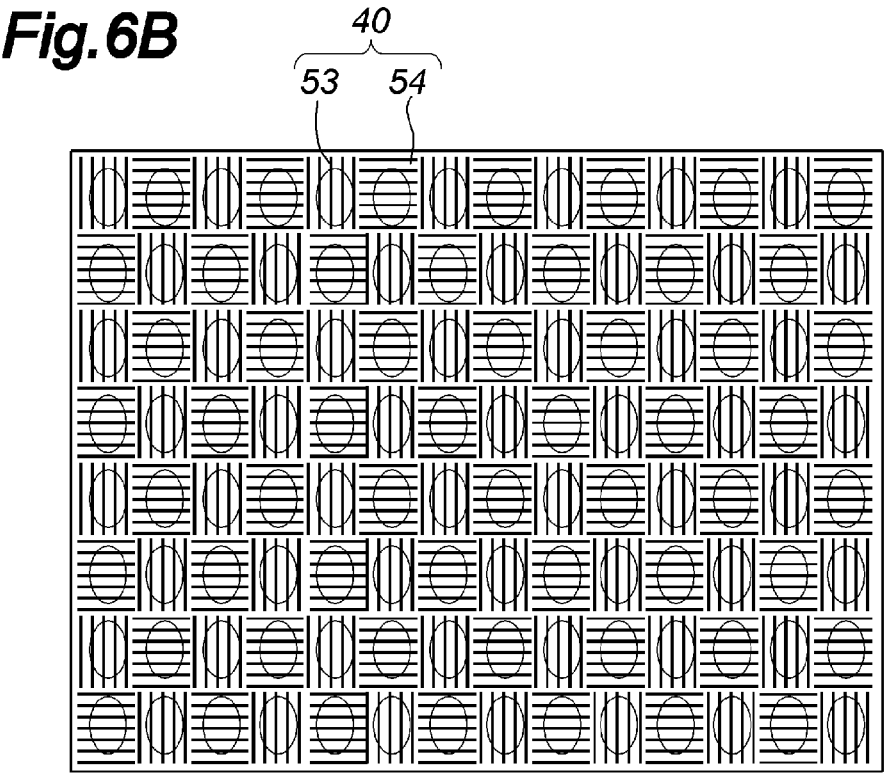

The structure of the upholstery linings used in the illustrated embodiments is described in the following with reference to FIGS. 3 to 5. FIGS. 3a, 3b, 4a and 4b illustrate examples of embossed surface patterns for upholstery members embodying the present invention. FIGS. 5a and 5b are views showing the embossed surface pattern for an upholstery member as seen from front, and FIGS. 6a and 6b are views of the same emboss pattern on the upholstery member as seen by a vehicle occupant from an oblique angle.

Figure 3A:
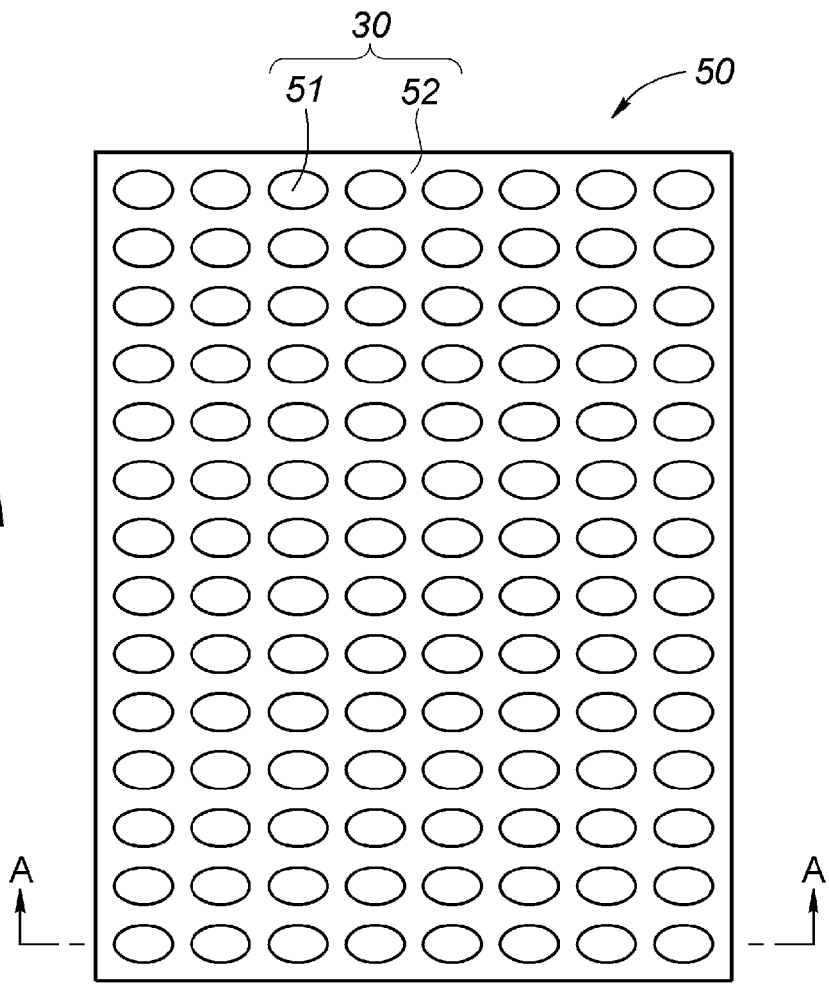
FIG. 3 is a front and a cross sectional view showing a first embossed surface pattern for an upholstery member embodying the present invention.

Referring to FIG. 3a, a plurality of substantially elliptic projections 51 are formed on a sheet member (plate member) 50, and the remaining part between the projections 51 consists of a depression 52 or the base surface of the sheet member 50. This pattern (first pattern) provides an appearance of natural leather. The embossed sheet member 50 may consist of general purpose plastics such as PP (polypropylene), TOP (thermoplastic olefin), etc., and may also consist of a thin sheet member or film. The emboss pattern can be formed by simple embossing, roller embossing or the like.

Figure 3B:
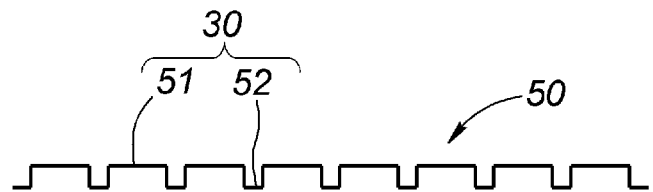

Referring to FIG. 3b showing a cross sectional view taken along line A-A of FIG. 3a, the projection 51 and depression 52 jointly define a first emboss pattern 30 characterized by a series of rectangular features as seen in cross sectional view.

Figure 4A:
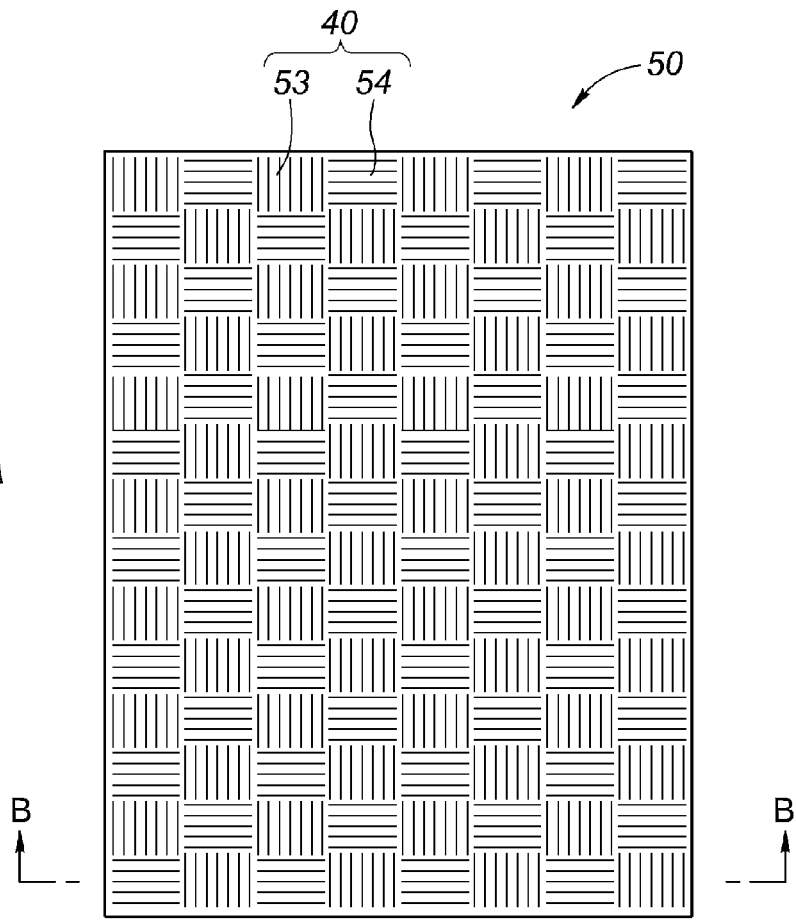
FIG. 4 is a front and a cross sectional view showing a second embossed surface pattern for an upholstery member embodying the present invention.
Figure 4B:
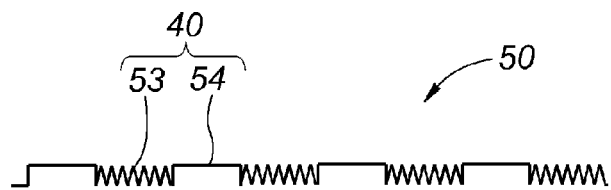

Referring to FIG. 4a, the same sheet member 50 (formed with the first emboss pattern 30 including the projections 51 and the depression 52 as discussed earlier) is additionally formed with a carbon fiber fabric pattern (second pattern) consisting of a checker pattern of two kinds of blocks 53 and 54 containing a plurality of vertical lines and a plurality of horizontal lines (as seen from front), respectively. This emboss pattern shown in FIG. 4 differs from the emboss pattern shown in FIG. 3. Referring to FIG. 4b showing a cross sectional view taken along line B-B of FIG. 4a, the vertical lines of the block 53 that are seen as lines when seen from front are each provided with a triangular cross section. Likewise, the horizontal lines of the block 54 that are seen as lines when seen from front are each provided with a triangular cross section. Thus, the blocks 53 and 54 contain projections which are shaped like ridge lines crossing the corresponding block 53, 54 either vertically or horizontally, and jointly define a second emboss pattern 40.

The first emboss pattern 30 shown in FIG. 3 and the second emboss pattern 40 shown in FIG. 4 are formed on the same sheet member 50 in a mutually superimposed relationship as shown in FIG. 5. Referring to FIG. 5a, the first emboss pattern 30 consists of the projections 51 having a uniform size and distributed in the depression 52, and the projections 51 are generally larger than the linear depressions and projections in each block 53, 54. The height of each projection 51 in the first emboss pattern 30 is greater than that of the projections in the blocks 53 and 54. The angle of the side wall of each projection 51 in the first emboss pattern 30 with respect to the major plane of the sheet member 50 is steeper than that of each projection of the second emboss pattern 40. The two emboss patterns 30 and 40 are superimposed with each other in this manner.

When the vehicle occupant views the sheet member 50 from front as shown in FIG. 5a, the second emboss pattern 40 having the appearance of carbon fiber fabric and including the blocks 53 and 54 is somewhat obscured by the first emboss pattern 30 having the appearance of natural leather and including the projections 51 and the depression 52, and is less visible than the first emboss pattern 30 as shown in FIG. 5b. More specifically, in the second emboss pattern 40 consisting of the blocks 53 and 54, the line of sight of the vehicle occupant is directly directed to the ridge of each linear projection having a triangular cross section, and the side walls of each linear projection are entirely within the view of the vehicle occupant. This linear projection is relatively lower in height and smaller in size as compared with the projections 51 of the first emboss pattern 30. As a result, the ridge line and the groove line each having a triangular cross section are obscured by the pronounced outline of each projection 51 so that the second emboss pattern 40 is less perceivable to the view of the vehicle occupant.

The first emboss pattern 30 consisting of the projections 51 and the depression 52 is characterized by rectangular cross sectional features, and the side wall of each projection 51 is highly steep in relation with the major plane of the sheet member 50. Therefore, the shadow of each projection 51 tends to be formed on the boundary between each projection 51 and the surrounding part of the depression 52, and this emphasizes the boundary of each projection 51 to the view of the vehicle occupant. As a result, the first emboss pattern 30 having the appearance of genuine leather is generally more emphasized than the second emboss pattern 40 to the view of the vehicle occupant.

On the other hand, when the sheet member 50 is viewed from an oblique angle as shown in FIG. 6a where the line of sight of the vehicle occupant is denoted with letter E, the ridge lines and groove lines defining small surface irregularities in the blocks 53 and 54 of the second emboss pattern 40 become more visible to the view of the vehicle occupant. The boundary of each projection 51 in the first emboss pattern 40 (the profile of each projection 51) is obscured by the surface irregularities formed in the blocks 53 and 54 of the second emboss pattern 40. As a result, the natural leather appearance of the first emboss pattern 30 is obscured by the carbon fiber fabric pattern of the second emboss pattern 40, and only the carbon fiber fabric pattern of the second emboss pattern 40 is clearly visible to the view of the vehicle occupant. When the vehicle occupant moves his line of sight from directly opposite to the sheet member 52 as shown in FIG. 5 to an oblique angle as shown in FIG. 6, the appearance of the surface thereof progressively changes from the natural leather pattern of the first emboss pattern 30 to the carbon fiber fabric pattern of the second emboss pattern 40.

In this manner, according to the illustrated embodiment, when the vehicle occupant squarely views the surface of the sheet member 52, the first emboss pattern 30 and the second emboss pattern 40 are superimposed with each other, and only the genuine leather appearance of the first emboss pattern 30 is visible because the boundary of each projection 51 is emphasized. When the vehicle occupant views the surface of the sheet member 52 from an oblique direction, only the carbon fiber fabric appearance of the second emboss pattern 40 is visible because the second emboss pattern 40 obscures the reflection of light from the boundary of each projection 51 in the first emboss pattern 30. Owing to this structure, the pattern of the upholstery member can be varied in appearance depending on the viewing angle of the vehicle occupant, and the effect of progressively changing the appearance of the upholstery member as the vehicle occupant's viewing angle is changed can be achieved.

Figure 7:
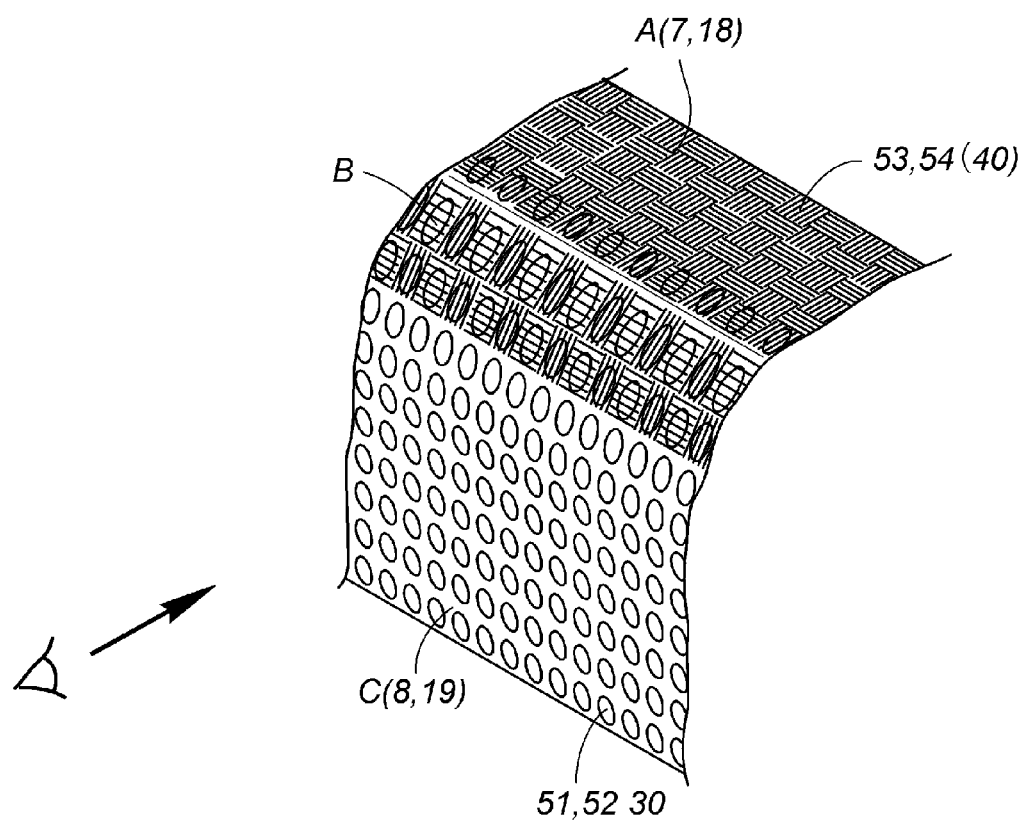
FIG. 7 is a perspective view showing the combined emboss pattern formed on the surface of an upholstery member applied to a curved surface of a vehicle.

In the following is described the embodiment of the present invention in which the upholstery member incorporated with the emboss pattern according to the present invention is applied to a vehicle, with reference to the appended drawings. FIG. 7 is a perspective view illustrating the upholstery member incorporated with the emboss pattern according to the present invention when applied to a curved part of the vehicle interior. In FIG. 7, the upholstery lining 6 for the instrument panel of the vehicle comprises the panel upper part 7 extending horizontally rearward from the lower edge of the front windshield (not shown in the drawing) and the panel front part 8 connected to the panel upper part 7 via a smooth curve. The same structure may also be applied to the upper bulge 13 illustrated in FIG. 2 that comprises the bulge upper part 18 extending horizontally inboard from the lower edge of the side window (not shown in the drawing) and the bulge front part 19 connected to the bulge upper part 18 via a smooth curve. However, the present invention may be applied not only to the upholstery lining 6 for the instrument panel and the upper bulge 13 but also to any other upholstery members.

Referring to FIG. 7, in the first region C (the panel front part 8 or the bulge front part 19) that directly faces the line of sight of the vehicle occupant, the genuine leather appearance of the first emboss part 1 consisting of the bulges 51 and the depression 52 as shown in FIGS. 3 and 5 is visible to the vehicle occupant. On the other hand, in the second region A (the panel upper part 7 or the bulge upper part 18) that obliquely faces the line of sight of the vehicle occupant, the carbon fiber fabric appearance of the second emboss pattern 50 consisting of the blocks 53 and 54 as shown in FIGS. 4 and 6 is visible to the vehicle occupant. The curved region connecting the regions A and C to each other changes appearance progressively from the genuine leather appearance to the carbon fiber fabric appearance.

The illustrated embodiment only requires a single component, and contributes to the reduction in the number of component parts, the reduction in the amount of assembly work, and the improvement in the ornamental effect. According to the illustrated embodiment, the ornamental pattern gradually changes from one pattern to another so that the ornamental effect may be enhanced.

Although the present invention has been described in terms of preferred embodiments thereof, it is obvious to a person skilled in the art that various alterations and modifications are possible without departing from the scope of the present invention. For instance, the emboss patterns in the foregoing embodiments consisted of the combination of the genuine leather pattern and the carbon fiber fabric pattern, but other patterns such as various graphic patterns, linear patterns, stone grain patterns, fabric emboss patterns and carved letter patterns may be also be applied to the present invention.

GLOSSARY 1 instrument panel
2 meter cluster
3 glove box
4 storage device
5 selector lever
6 panel upholstery lining
7 panel upper part
8 panel front part
10 door
11 door upholstery lining
12 armrest
13, 14, 15 bulge
16 door handle
17 storage pocket
18 bulge upper part
19 bulge front part
30 first emboss pattern
40 second emboss pattern
50 sheet member 51 projection
52 depression
53 block (vertical lines)
54 block (horizontal lines)

The invention claimed is:

1. An embossed vehicle upholstery member, wherein:
a first emboss pattern and a second emboss pattern which are each visible to a viewer are formed on a surface of the upholstery member in a mutually superimposed relationship, the first emboss pattern presenting a view having a different dependency on a viewing angle from that of the second emboss pattern,and when viewed at an oblique angle, the appearance of the surface progressively changes from the first emboss pattern to the second emboss pattern,
wherein the first emboss pattern includes a plurality of projections formed on a sheet member such that a part between the projections forms a depression, each projection having a flat top and the depression having a flat bottom, and
wherein the second emboss pattern is formed only on the flat top of the projections and on the flat bottom of the depression.

2. The embossed vehicle upholstery member according to claim 1, wherein the first emboss pattern differs from the second emboss pattern so that, depending on the viewing angle of a vehicle occupant, the first emboss pattern obscures the light reflected from the profiles of the second emboss pattern or the second emboss pattern obscures the light reflected from the profiles of the first emboss pattern, and one of the patterns is more visually emphasized than the other.

3. The embossed vehicle upholstery member according to claim 1, wherein the first emboss pattern is primarily formed by curved lines, and the second emboss pattern is primarily formed by straight lines as seen in plan view.

4. The embossed vehicle upholstery member according to claim 1, wherein the first emboss pattern is defined by a finer emboss than the second emboss pattern.

5. The embossed vehicle upholstery member according to claim 1, wherein the first emboss pattern is defined by a surface irregularity having a greater vertical deviation than the second emboss pattern.

6. The embossed vehicle upholstery member according to claim 1, wherein the first emboss pattern is defined by a surface irregularity having a steeper profile than the second emboss pattern.

7. The embossed vehicle upholstery member according to claim 1, wherein the upholstery member extends along a contour including a pair of planes forming an angle relative to each other and smoothly connected by a curved plane.

8. The embossed vehicle upholstery member according to claim 1, wherein the first emboss pattern has rectangular features in the cross section.

9. The embossed vehicle upholstery member according to claim 1, wherein the second emboss pattern has triangular features in the cross section.

10. An embossed vehicle upholstery member, wherein:
a first emboss pattern and a second emboss pattern visible to a viewer are formed on a surface of the upholstery member in a mutually superimposed relationship, the first emboss pattern presenting a view having a different dependency on a viewing angle from that of the second emboss pattern, and when viewed at oblique angle, the appearance of the surface progressively changes from first emboss pattern to the second emboss pattern,
wherein the first emboss pattern is primarily formed by curved lines, and the second emboss pattern is primarily formed by straight lines as seen in plan view,
wherein the first emboss pattern includes a plurality of projections formed on a sheet member such that a part between the projections forms a depression, each projection having a flat top and the depression having a flat bottom, and
wherein the second emboss pattern is formed only on the flat top of the projections and on the flat bottom of the depression.

11. An embossed vehicle upholstery member, wherein:
a first emboss pattern and a second emboss pattern visible to a viewer are formed on a surface of the upholstery member in a mutually superimposed relationship, the first emboss pattern presenting a view having a different dependency on a viewing angle from that of the second emboss pattern,
wherein the first emboss pattern obscures the light reflected from the profiles of the second emboss pattern or the second emboss pattern obscures the light reflected from the profiles of the first emboss pattern, and one of the patterns is obscured by the other emboss pattern so that the appearance of the surface progressively changes from first emboss pattern to the second emboss pattern,
wherein the first emboss pattern includes a plurality of projections formed on a sheet member such that a part between the projections forms a depression, each projection having a flat top and the depression having a flat bottom, and
wherein the second emboss pattern is formed only on the flat top of the projections and on the flat bottom of the depression.

* * * * *